May 31, 1927.
J. FENTRESS
1,630,479
THERMOSTATIC PUMP
Original Filed Dec. 3, 1925
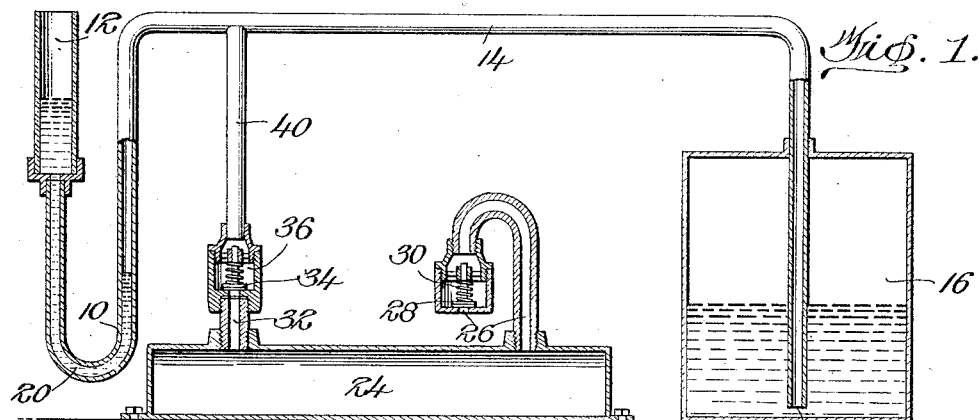
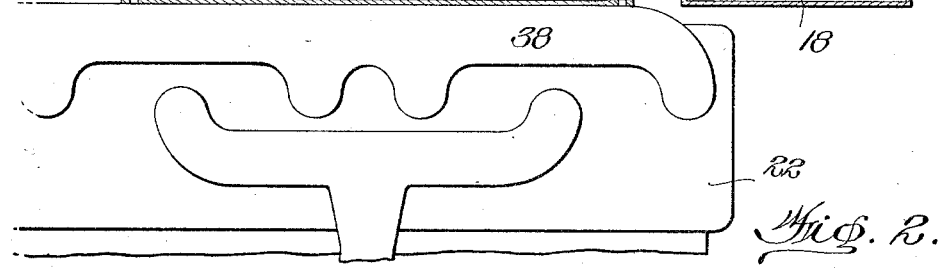
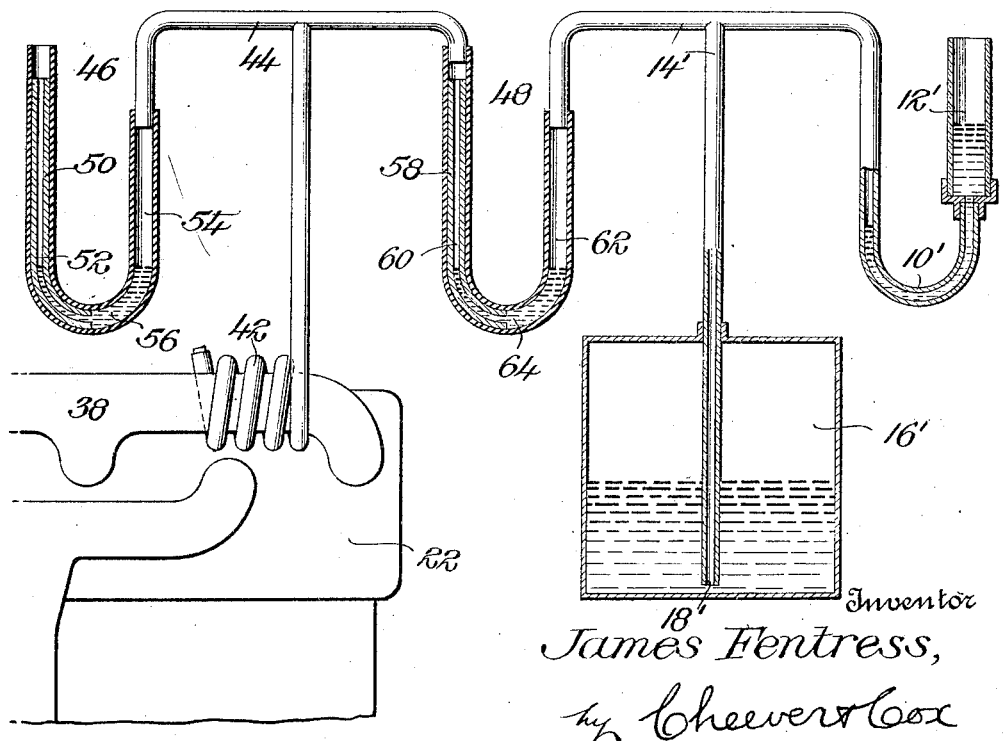
Inventor
James Fentress,
by Cheever & Cox
Attorneys Patented May 31, 1927.

1,630,479

UNITED STATES PATENT OFFICE.

JAMES FENTRESS, OF CHICAGO, ILLINOIS.

THERMOSTATIC PUMP.

Original application filed December 3, 1925, Serial No. 72,900. Divided and this application filed May 12, 1926. Serial No. 108,464.

My invention relates to improvements in pumps of the pneumatic displacement type, and my purpose, generally speaking, is to provide a pump of this type that is exceedingly simple in construction, cheap and easy to produce and which will operate automatically, periodically, when subjected to materially varying temperatures, to supply small quantities of air to any place where needed.

My improved pump is capable of a variety of uses, being particularly beneficial when used in connection with a system employing a U-tube or similar gauge for indicating the depth of liquid in a tank to automatically, periodically supply small quantities of air to the system to insure that the gauge always will indicate accurately the depth of liquid in the tank.

Experience has shown that a system employing a U-tube or similar gauge for indicating the depth of liquid in a tank loses its accuracy after a time due to greater expansion and contraction of the air in the system, under variations of pressure, than occurs in the liquid, which allows the liquid to creep into the system and thus destroy the accuracy of the latter. Pumps of various designs have been employed heretofore in systems of the kind mentioned to drive out of such systems any liquid which may find its way into the same, but so far as I am aware in all prior systems of the type mentioned which employ air supply pumps it is necessary to operate the pump each time it is desired to secure an accurate reading of the gauge. By incorporating my improved pump in a liquid measuring system of the type mentioned, however, a system such as is disclosed in my prior application 72,900 filed December 3, 1925, for example, of which this application is a division, the necessity of manually operating any part of the system is eliminated and the gauge is caused at all times to indicate accurately the level of liquid in the tank.

My inventive idea is capable of embodiment in different mechanical structures, certain of which are illustrated in the accompanying drawings, but it is to be understood that the structures shown are intended merely as disclosures of the essential features and novel characteristics of my invention in certain preferred forms and that its scope is as defined in the appended claims.

In the drawings:—

Fig. 1 illustrates an embodiment of my invention employing mechanical valves; and Fig. 2 illustrates an alternative embodiment of my invention employing liquid valves.

Fig. 1 illustrates, conventionally, a liquid depth indicating system of well known form consisting essentially of a U-tube 10 in communication at one end with a sight gauge 12 and at its other end, through a pipe 14, with a tank 16, such, for example, as the gasoline supply tank of an automobile, said pipe 14 terminating adjacent to the bottom of tank 16 whereby, when liquid is exhausted from said pipe and the latter is filled only with air, the pressure of the liquid within the tank acting against the air confined in pipe 14 at the open end 18 of said pipe, will cause mercury 20 contained within U-tube 10 to seek a level in calibrated gauge 12 which will indicate the depth of liquid in tank 16, all in a manner which is well known and which needs no further explanation in so far as the present invention is concerned.

As aforementioned, experience has shown that a system of the foregoing type loses its accuracy after a time due to greater expansion and contraction of the air in pipe 14, under variations of pressure, than occurs in the liquid in tank 16, which allows the liquid in said tank to creep into the open end 18 of pipe 14 and thus destroy the accuracy of the system. As a consequence it is necessary periodically, or whenever it is desired to determine accurately by means of gauge 12 the depth of liquid in tank 16, to supply air to pipe 14 to drive therefrom any liquid which may have entered the open end of same, and since heretofore, in so far as I am aware, only manually operable means have been provided for accomplishing this purpose, the benefits of my improved pump became at once apparent when it is understood that same functions automatically, periodically when subjected to materially varying temperatures, such as are readily obtainable in the vicinity of engine 22, to supply air to pipe 14, since the necessity of manually operating any part of the system to secure an accurate reading of gauge 12 is eliminated.

My improved pump consists of a closed air containing receptacle 24 having an air intake passage 26 controlled by a valve 28 held normally closed by a spring 30, and an air discharge passage 32 controlled by a valve 34 held normally closed by a spring 36. This receptacle may be located wherever it will be subjected to materially varying temperatures, for instance it may be mounted, as shown, upon the exhaust manifold 38 of engine 22, and when so located it operates as follows:—When the receptacle is cold the air therein is quite dense, but when the receptacle is heated, as occurs for instance due to the radiation of heat from manifold 38 when engine 22 is set into operation, the air in said receptacle is caused to expand thereby creating within the receptacle a pressure which holds inwardly opening valve 28 to its seat and which forces outwardly opening valve 34 open to permit the escape of air from the receptacle through discharge passage 32. When, on the other hand, the receptacle is cooled, as occurs for instance due to cooling of manifold 38 when engine 22 is stopped, the air in said receptacle contracts, thus creating a partial vacuum in the receptacle which causes outwardly opening valve 34 to be held to its seat and inwardly opening valve 28 to be opened against the force of its closing spring 30, thereby admitting air to the receptacle and restoring the air therein to normal pressure, whereupon the pump is ready to repeat the operation just recounted whenever the engine again is started, or whenever, due to any other cause, the receptacle again is heated.

To install my pump in a liquid depth indicating system of the type previously described, discharge passage 32 simply is connected by means of a pipe 40, as shown in Fig. 1 of the drawings, with pipe 14 at any suitable point in said pipe 14 between U-tube 10 and tank 16, and when so installed its automatic operation each time receptacle 24 is heated and subsequently cooled, as, for example, each time engine 22 is started and stopped, to supply air to pipe 14 under sufficient pressure to force therefrom any liquid that may have entered the open end 18 of said pipe is obvious.

As pipe 14 does not require a continuous supply of air, but to the contrary requires only that a supply of air at intervals to assure that gauge 12 will indicate accurately the height of liquid in tank 16 it is manifest that the arrangement described meets all practical requirements in a liquid depth indicating system and at the same time eliminates the necessity of periodically, manually operating any part of the system. I desire to have it understood, however, that in illustrating and describing my improved pump as incorporated in a liquid depth indicating system, in which capacity it possesses particular utility, I do not thereby intend to convey the idea that it is restricted to such use as it may be employed to advantage in other capacities.

In order to illustrate that no particular shape or form of receptacle 24 or of valves 28, 34 is essential to my present broad inventive idea, I have shown in Fig. 2 another specific embodiment of my invention wherein the closed pump receptacle is in the form of a coil of tubing 42, wound for example, around the exhaust manifold 38. One end of coil 42 is closed and the other end thereof is connected to an intermediate portion of a pipe 44. One end of pipe 44 terminates in a U-valve 46 performing all the functions of valve 28 by which it might be replaced, and the other end of said pipe terminates in a U-valve 48 performing all the functions of valve 34 by which it might be replaced.

Essentially the arrangement of Fig. 2 is that of Fig. 1, assuming that inlet passage 26 was arranged to communicate with receptacle 24 through outlet passage 32 between the receptacle and valve 34, the operation in either case being the same.

U-valve 46 is made of any suitable material, for instance, rubber hose, of sufficiently large diameter so that the arm thereof remote from pipe 44 can receive and retain a tube 50 having a small internal passage 52 terminating at the bottom of the U-valve. The result is that U-valve 46 has an exceedingly small internal passage in the arm thereof remote from pipe 44 entering at the bottom of the U-valve a comparatively large passage 54 in the arm of the U-valve that is adjacent to and connected with pipe 44. The valve described can be constructed by using a glass thermometer tube as member 50 and a rubber tube or the like for the external member 46, and the valve is completed by filling the lower portion thereof with mercury 56.

U-valve 48 is identical with U-valve 46 in that it includes a rubber external case having a tube 58 in one arm thereof provided with an exceedingly small passage 60 terminating at the bottom of the valve in communication with a relatively large internal passage 62 in the other arm thereof, the valve being completed similarly to valve 46 by filling the lower portion thereof with mercury 64. When connected with pipe 44 the only difference between valves 46, 48 is that the arm of valve 46 having the relatively large passage 54 therein is connected with said pipe, while the arm of valve 48 having the small passage 60 therein is connected with said pipe.

In the operation of the mechanism of Fig. 2, assuming that coil 42 and pipe 44 are full of air, that they are cool and that heat is applied by the manifold 38 to said coil, the air in the latter will be expanded and cause equal pressures to be exerted in the passages 54, 60, thereby applying pressure to the two bodies of mercury 56, 64. The pressure in passage 54 tends to force mercury 56 up passage 52, while on the other hand, the pressure in passage 60 drives the thin column of mercury 64 therein into the large volume of mercury in passage 62. The result is that mercury 64 is forced only a slight distance up passage 62 before there is an opportunity for the air under pressure in pipe 44 to bubble past this mercury, and if the arm of U-valve 48 remote from pipe 44 is connected as shown through a pipe 14′ with a liquid tank 16′ and a U-tube 10′ including a sight gauge 12′, as in Fig. 1, the air bubbling past mercury 64 will operate exactly as in Fig. 1; viz, it will drive out of pipe 14′ any liquid which may have passed upward into same at its open end 18′ disposed within tank 16′, thus insuring accurate reading of gauge 12′. During heating of coil 42 none of the expanded air in said coil and pipe 44 can pass the column of mercury in passage 52 of U-valve 46 and consequently said valve performs all of the functions of valve 28 heretofore described.

When, after a time, coil 42 is cooled as, for instance, following stoppage of engine 22 and consequent cooling of the manifold 38 thereof, the air in said coil and in pipe 44 contracts thus creating a partial vacuum at the upper ends of passages 54, 60 with resultant reversal of the operation of valves 46, 48; viz, mercury 64 is sucked up passage 60 with the result that no air can pass from pipe 14 through valve 48 into pipe 44 while, on the other hand, mercury in passage 52 is sucked down into the body of mercury in passage 54 with the result that air then drawn through passage 52 bubbles past mercury 56 and thus refills the pipe 44 and coil 42, completing the cycle of operation.

Of course, the mercury flowing into passage 60 will register as a fall of mercury in gauge 12′, but since the gauge in practice has a diameter of approximately one-fourth of an inch while the diameter of passage 60 approximately is only three sixty-fourths of an inch, the apparent change in reading on the gauge is negligible.

I claim:

1. In a thermostatic pump, in combination, a closed receptacle having intake and discharge ports communicating therewith, a normally closed liquid valve at the intake opening permitting the entrance and preventing the discharge of air at that point, and a normally closed liquid valve at the discharge port permitting the outward passage of air from the receptacle and preventing its return to the receptacle, the valves being so adjusted that the heating and consequent expansion of air in the receptacle closes the intake valve and opens the discharge valve and that cooling of the receptacle and consequent contraction of the air content closes the discharge valve and opens the intake valve.

2. In a thermostatic pump, in combination, a closed receptacle having intake and discharge ports, a normally closed liquid valve at the intake port permitting the entrance and preventing the discharge of air at that point, and a normally closed liquid valve at the discharge port permitting the outward passage of air from the receptacle and preventing its return to the receptacle, the valves being so adjusted that the heating and consequent expansion of air in the receptacle closes the intake valve and opens the discharge valve, and that cooling of the receptacle and consequent contraction of the air content closes the discharge valve and opens the intake valve, and means periodically varying the temperature of the receptacle.

3. In a thermostatic pump, in combination, a closed receptacle having intake and discharge ports communicating therewith, a normally closed U-tube liquid valve at the intake opening permitting the entrance and preventing the discharge of air at that point, and a normally closed U-tube liquid valve at the discharge port permitting the outward passage of air from the receptacle and preventing its return to the receptacle, the valves being so adjusted that the heating and consequent expansion of air in the receptacle closes the intake valve and opens the discharge valve and that cooling of the receptacle and consequent contraction of the air content closes the discharge valve and opens the intake valve.

4. In a thermostatic pump, in combination, a closed receptacle having intake and discharge ports, a normally closed U-tube liquid valve at the intake opening permitting the entrance and preventing the discharge of air at that point, and a normally closed U-tube liquid valve on the discharge port permitting the outward passage of air from the receptacle and preventing its return to the receptacle, the valves being so adjusted that the heating and consequent expansion of air in the receptacle closes the intake valve and opens the discharge valve, and that cooling of the receptacle and consequent contraction of the air content closes the discharge valve and opens the intake valve, and means periodically varying the temperature of the receptacle.

5. In a thermostatic pump, in combination, a closed receptacle adapted to be subjected to variable temperatures to cause air therein alternately to expand and contract, and a pair of U-tube liquid valves connected with said receptacle, one of said valves opening towards said receptacle and the other opening away from the same.

6. In a thermostatic pump, in combination, a closed receptacle adapted to be subjected to variable temperatures to cause air therein alternately to expand and contract, and a pair of U-tube liquid valves connected with said receptacle, each of said valves including a pair of arms having passages therein, respectively, of different sizes, the arm of one of said valves that has the smaller passage therein being connected with said receptacle and the arm of the other of said valves that has the larger passage therein being connected with said receptacle.

In witness whereof, I have hereunto subscribed my name.

JAMES FENTRESS.